Jan. 10, 1967   E. V. BLOOMQUIST ET AL   3,297,068
MACHINE FOR CUTTING MATERIAL INTO STRIPS
Filed March 4, 1964   2 Sheets-Sheet 1

INVENTORS
EVERT V. BLOOMQUIST
GERALD E. BLOOMQUIST
BY Rudolph L. Lowell
ATTORNEY Jan. 10, 1967   E. V. BLOOMQUIST ETAL   3,297,068
MACHINE FOR CUTTING MATERIAL INTO STRIPS
Filed March 4, 1964   2 Sheets-Sheet 2
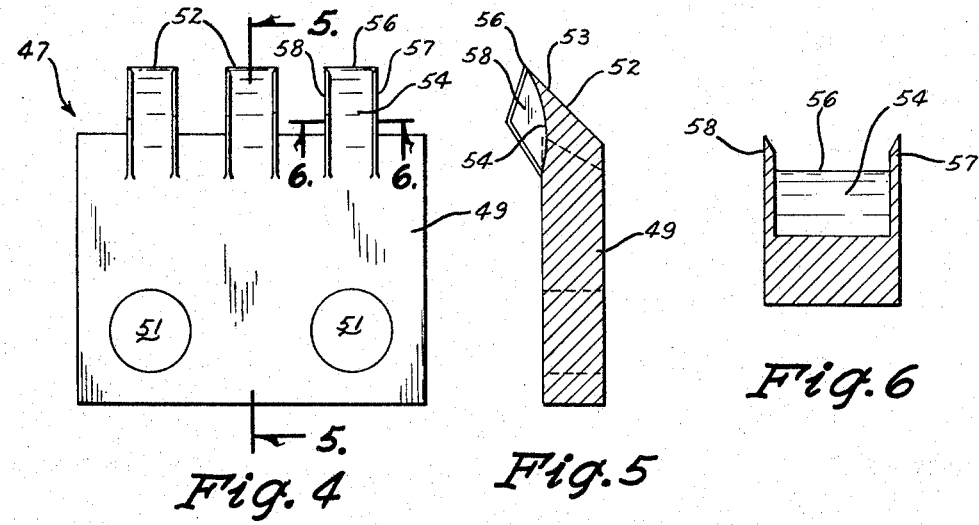
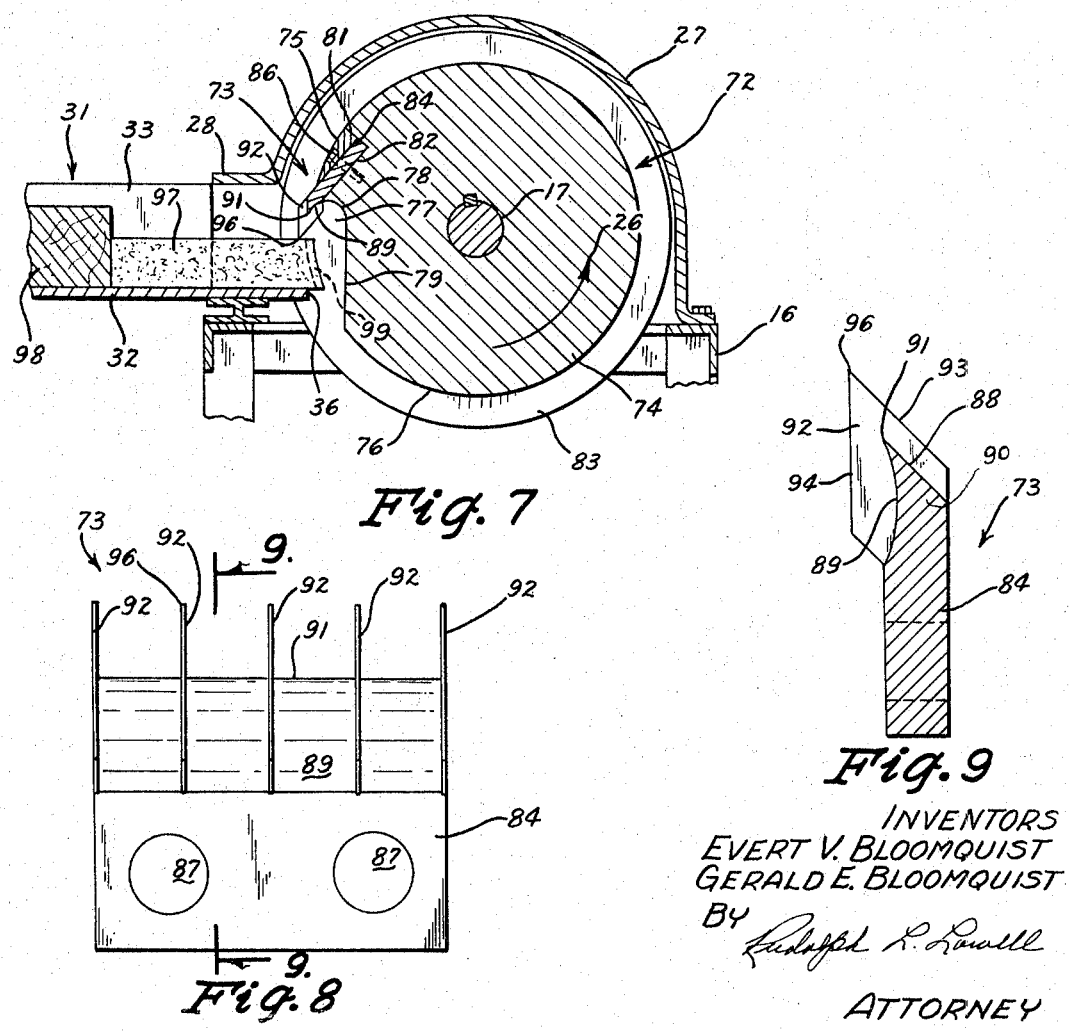
INVENTORS
EVERT V. BLOOMQUIST
GERALD E. BLOOMQUIST
BY
ATTORNEY

United States Patent Office 3,297,068
Patented Jan. 10, 1967

3,297,068
MACHINE FOR CUTTING MATERIAL INTO STRIPS
Evert V. Bloomquist and Gerald E. Bloomquist, both of P.O. Box 807, Wausau, Wis. 54980
Filed Mar. 4, 1964, Ser. No. 349,438
4 Claims. (Cl. 146—117)

The invention relates to a machine for cutting material into narrow strips and more particularly to a machine having a rotary cutter head operable to cut meat and vegetables into narrow strips.

It is the object of this invention to provide an improved machine for cutting solid food products or like material into strips.

Another object of the invention is to provide a rotatable cutter head with a stripper knife for cutting material into a plurality of narrow strips.

A further object of the invention is to provide a rotatable cutter head with guide means for maintaining the material to be cut in radial alignment with the cutter head.

Still another object of the invention is to provide a rotatable cutter head with a single knife which is capable of cutting material into a plurality of strips.

Yet another object of the invention is to provide a rotary cutter head with cut material receiving cavities which coact with the knives of the cutter head to effect a peeling separation of the material into a plurality of uniform strips.

A further object of the invention is to provide a cutter head with a cylindrical body member having a curved axial cavity and a knife member having a curved end section cooperating with the cavity curvature to form a smooth surface for progressively directing strips of cut material into the cavity.

Another object of the invention is to provide a portable and compact material cutting machine which is economical and rugged in construction and reliable and efficient in use.

Additional objects, features and advantages of this invention will become apparent from the following description relating to the accompanying drawing wherein:

FIG. 4 is an enlarged plan view of the bottom side of the stripper knife on the cutter head of FIG. 1;

FIG. 5 is a sectional view taken along the line 5—5 of FIG. 4;

FIG. 6 is an enlarged sectional view taken along the line 6—6 of FIG. 4;

FIG. 7 is a sectional view similar to FIG. 2 showing a cutter head having a modified stripper knife;

FIG. 8 is an enlarged plan view of the bottom side of the stripper knife shown in FIG. 7; and FIG. 9 is a sectional view taken along the line 9—9 of FIG. 8.

Figures 1, 2, 3:
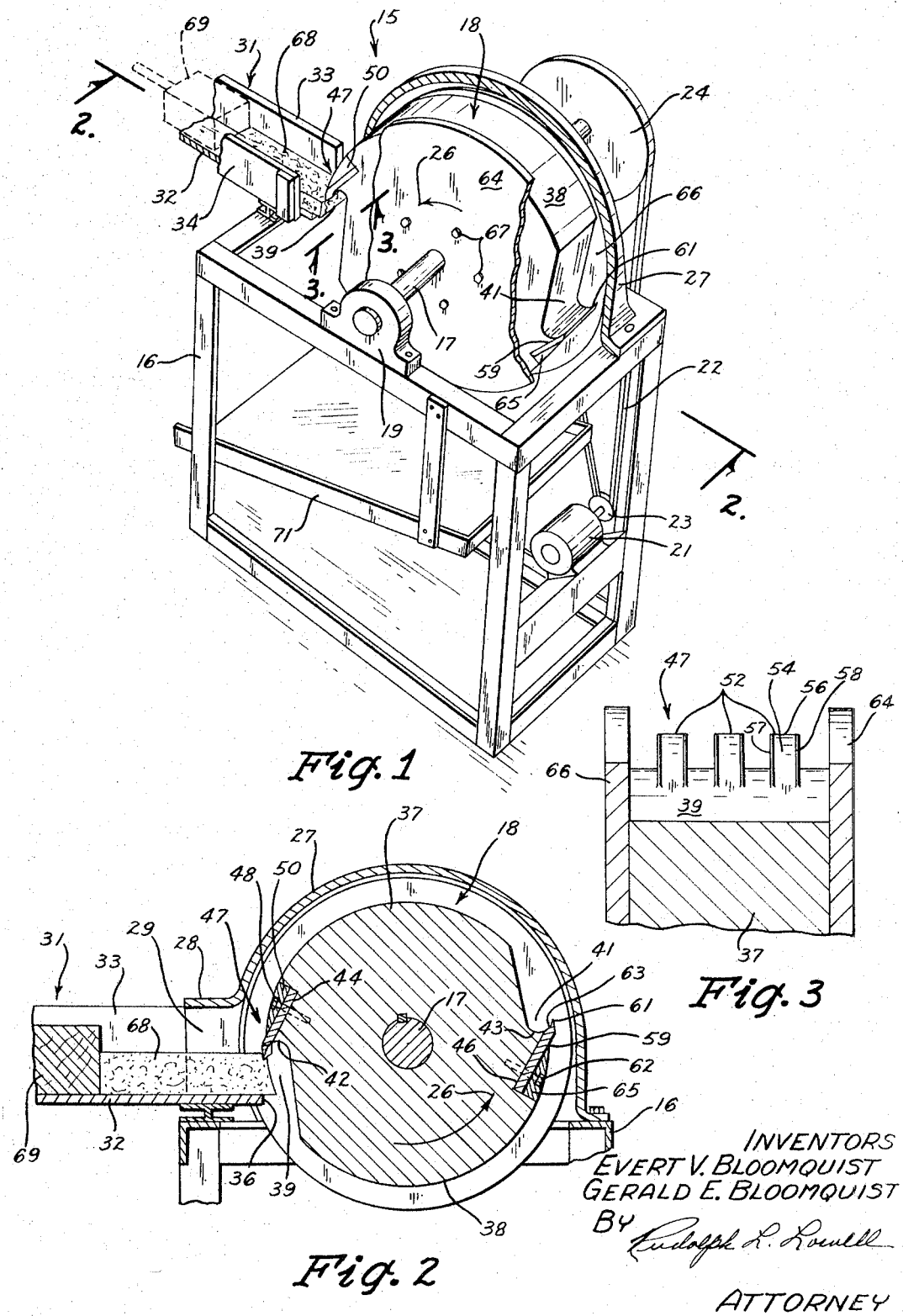
FIG. 1 is a perspective view of the material cutting machine of this invention with a portion of the outer casing and cutter head broken away to show the cutting knives.
FIG. 2 is an enlarged sectional view taken along the line 2—2 of FIG. 1.
FIG. 3 is an enlarged fragmentary sectional view taken along the line 3—3 of FIG. 1.

Referring to the drawing, there is shown in FIG. 1 the material cutting machine of this invention indicated generally at 15. The machine 15 comprises a frame structure 16 having an open and rectangular-shaped top. A shaft 17 carrying a rotor or cutter head 18 is rotatably mounted on the top of the frame structure 16 by a pair of bearings 19, one of which is shown.

An electric motor 21 is drivably connected to the shaft 17 by a belt 22 trained around the drive pulley 23 on the motor 21 and a large driven pulley 24 mounted on the shaft 17. The motor 21 is secured to the frame structure 16 below the cutter head 18 and drives the cutter head 18 in a counterclockwise direction as shown by the arrow 26.

The top sector of the cutter head 18 is enclosed by a housing or casing 27 secured to the top portion of the frame structure 16. As shown in FIG. 2, the housing 27 has an inverted U-shaped outwardly extended flange 28 forming part of a passage 29 in radial alignment with the cutter head 18. A material guiding trough 31 is mounted on the frame structure 16 in alignment with the flange 28 of the housing 27. The trough 31 has a base wall 32 and upright side walls 33 and 34 to complete the passage 29. The base wall 32 terminates in an edge 36 adjacent the peripheral surface of the cutter head 18.

As shown in FIGS. 1 and 2, the cutter head 18 comprises a cylindrical-shaped body member 37 having a continuous peripheral surface 38 formed with diametrically spaced axial cavities 39 and 41. The sections of the peripheral surface 38 which forms the cavities 39 and 41 are of a J or hook-shape transversely of the body member 37 with the trailing sections 42 and 43 curved outwardly and forwardly relative to the direction of rotation of the body member. The cavities 39 and 41 have a circumferential length and radial depth to receive the strips of material that are severed by the cutter head 18.

The peripheral surface of the body member 37 adjacent the trailing sections of the cavities 39 and 41 is formed with axially extended recesses 44 and 46. The recesses 44 and 46 have a right-angle shape with radial walls positioned in a common radial plane and base walls projected in opposite directions from such common plane.

A stripper knife indicated generally at 47 is seated in the recess 44 and secured to the body member 37 by bolts 48 and clamp 50. As shown in FIGS. 4 and 5, the knife 47 comprises a flat rectangular-shaped plate 49 having a pair of spaced holes 51 to accommodate the bolts 48. Integral with one side of the plate 49 are a plurality of teeth 52 evenly spaced across the length of the plate. Each tooth 52 has a width substantially equal to the space between adjacent teeth and the outer teeth are spaced inwardly from the ends of the plate 49.

The teeth 52 project laterally away from the plate 49 and have inclined back surfaces 53 and concave front surfaces 54 which intersect to form knife edges 56 extended longitudinally of the plate 49. Each tooth 52 has side flanges 57 and 58 which are substantially identical in shape and of a length substantially equal to the length of a concave front surface 54 from which they project. The cutting edges of the side flanges 57 and 58 are angularly disposed so as to form an included angle of about one hundred and thirty degrees.

As shown in FIG. 2, when the knife 47 is assembled on the body member 37, the teeth 52 are positioned radially outward beyond the radial extent of the peripheral surface 38 and forwardly of the trailing section or surface 42 of the cavity 39. With the knife 47 in this position the cutting edges 56 extend axially of the cutter head 18 and the knife edges 57 and 58 extend generally circumferentially of the cutter head 18.

A flat knife 59 having a continuous and axially extended cutting edge 61 is seated in the recess 46 and secured to the body member 37 by bolts 62 and clamp 65. The forward section of the knife 59 has a concave front surface 63 extended forwardly and radially of the trailing surface 43 of the cavity 41 so that the contour of the curved surface 63 and the curvature of the surface 43 forms a smooth continuous surface which acts to progressively direct the material cut by the knife 59 into the cavity 41.

The distance that the knife edge 61 projects radially beyond the peripheral surface 38 of the body member 37 determines the depth of cut made by the knife 59.

Referring to FIGS. 1 and 3, it is seen that a pair of discs 64 and 66 are secured to opposite end walls of the body member 37 by bolts 67. The peripheral sections of the discs 64 and 66 project radially from the peripheral surface of the body member 37 and terminate adjacent the wall of the housing 27. The diameters of the discs 64 and 66 are greater than the diameter of the body member 37 so as to position the peripheral surface 38 of the body member and the knives 47 and 59 between the discs 64 and 66. The discs 64 and 66 are in alignment with the side walls 33 and 34 of the material receiving trough 31 and function as guide means for maintaining the material to be cut in radial alignment with the body member 37.

The machine is operated by connecting the electric motor 21 to a source of electrical power. The motor drives the cutter head 18 in a direction indicated by the arrow 26 in FIGS. 1 and 2. Rotation of the cutter head 18 sequentially moves the stripper knife 47 and the knife 59 past the edge 36 of the trough 31. As illustrated in FIG. 2, the edge 36 is positioned between the discs 64 and 66 in a clearance relation with the ends of the knives 47 and 59.

The material 68 to be cut is placed in the trough 31 and forced toward the cutter head 18 by a plunger 69. The inner end of the material 68 is moved into bearing engagement with the smooth peripheral surface 38 of the body member 37. This peripheral surface functions as a stop to limit the inward movement of the material 68.

With the inner end of the material 68 in this position the teeth 52 of the stripper knife 47 cut narrow rectangular strips from the end of the material 68. This cutting action is achieved by the simultaneous action of the axially extended and circumferentially extended knife edges of the teeth 52. As the stripper knife 47 severs the material from the main body thereof the severed strips progressively move from the concave surfaces 54 of the teeth and the curved surface 42 of the body member 37 into the cavity 39. The strips of material in the cavity 39 are carried circumferentially in a downward direction and discharged into a pan 71 secured to the frame structure 16 below the cutter head 18.

After the stripper knife 47 is moved past the trough edge 36 the inner end of the material 68 bears against the peripheral surface 38 of the body member 37 forwardly of the axial flat knife 59. Because of the spaced relation of the teeth 52 the cut end of the material 68 is formed with a plurality of spaced ribs which are severed from the main body of the material by the axial knife edge 61 of the knife 59. The material cut by the knife 59 is in the form of uniform strips having substantially the same dimensions as the strips cut by the teeth 52. As this material is cut it progresively move along the mooth curved surface 63 of the knife 59 and the arcuate surface 43 of the body member 37 into the cavity 41. The strips of material in the cavity 41 are carried circumferentially and discharged into the pan 71.

The dimensions of the strips of material may be varied by replacing the stripper knife 47 with another stripper knife having a different number of cutting teeth and a different spaced relationship between the cutting teeth. The depth of cut of the knives 47 and 59 may be varied by adjustment relative to the base walls of the recesses 44 and 46 in the body member 37.

In order to increase the cutting capacity of the machine, the cutter head 18 may be formed with additional pairs of circumferentially spaced axial cavities and associated knives similar to the knives 47 and 59. When the number of cavities in the rotating body member 37 is increased the angular relationship between the stripper knife 47 and the axial knife 59 is changed. However, the sequential operational relationship between these knives is not altered.

The material cutting machine shown in FIG. 7 is identical to the machine 15 of FIG. 1 except that the cutter head 72 is provided with a modified stripper knife 73. The cutter head 72 comprises a cylindrical body member 74 having a continuous peripheral surface 76 formed with a J or hook-shaped cavity 77. The trailing section 78 of the surface which defines the cavity 77 is of an arcuate shape and is joined with a substantially linear forward section 79. The cavity 77 has a circumferential length and a radial depth to receive the strips of material that are severed by the cutter head knife 73.

The peripheral section of the body member 74 adjacent the trailing section 78 of the cavity 77 is formed with an axially extended recess 81 having a flat base surface 82 extended in a direction normal to a radius of the body member. Positioned on opposite sides of the body member 74 are a pair of discs 83, only one of which is shown. The peripheral sections of the discs 83 extend radially beyond the peripheral surface 76 of the body member 74 and function as guides for maintaining the material 68 to be cut in alignment with the cutter head 72.

The stripper knife 73 has a flat body 84 positioned in surface engagement with the flat base wall 82 of the recess 81. Bolts 86 extended through holes 87 in the body 84, are threaded into the body member 74 and coact with clamp 75 to hold the knife 73 on the body member 74. As shown in FIG. 9, the end 90 of the body 84 is of a generally pointed form having an inclined forwardly and outwardly extended side 88 and an inner side 89 of a concave curvature. The straight side 88 and the adjacent curved side 89 intersect to form a knife edge 91 extended axially across the body 84.

Integrally formed with the end 90 of the body 84 are a plurality of axially spaced knife blades 92 which extend in planes substantially normal to the flat body 84 and project outwardly from the sides 88 and 89 of the pointed end 90 to form blade edges 93 and 94 which intersect at points 96 that are spaced outwardly and forwardly from the knife edge 91.

When the knife 73 is attached to the body member 74 by bolts 86 as shown in FIG. 7, the concave surface or side 89 formed at the end 90 of the body 84 is continuous with the curved trailing section 78 of the wall of the cavity 77. The axially extended knife edge 91 and the forward edges 94 and points 96 are positioned radially of the cavity 77 and outwardly from the peripheral surface 76 of the body member 74.

When the cutter head 72 is rotated in the direction of the arrow 26 the stripper knife 73 is moved downwardly past the stationary trough edge 36. The material 97 to be cut is moved into the rotating cutter head 72 by the plunger 98. The smooth peripheral surface 76 of the cutter head 72 limits the inward movement of the material 97 and exposes a limited length of material to the cutting action of the stripper knife 73.

As shown in FIG. 7, the circumferentially extended knife blades 92 cut slits into the end section of the material 97. The slit material is then severed from the main body thereof by the axial knife edge 91 and the concave curved section 89 and the arcuate surface 78 guide the cut strips into the cavity 77. The knife edge 91 being radially inward and rearwardly from the points 96 only removes about one-half of the slitted material at the end section of the material 97, as indicated by the broken line 99.

Each time the stripper knife 73 passes through the end of the material the circumferentially extended knife blades 92 form vertical grooves or slits and the axially extended knife edge 91 cuts transversely across the entire end section of the material 97. The combined cutting action of the knife blades 92 and the axial knife edge 91 produces long narrow strips of material.

In order to increase the cutting capacity of the machine the number of stripper knives and associated axial cavities of the cutter head can be increased. Each stripper knife would function as the stripper knife 73 to do a complete job of size strip cutting.

In summary the material cutting machine of this invention has an improved cutter head for cutting material into long and narrow strips of uniform dimensions. The cutter head carries a stripper knife which projects forwardly over a material receiving cavity in the peripheral surface of the cutter head. The stripper knife has a plurality of axially spaced circumferentially extended knife edges for cutting grooves in the end of the material and an axially extended knife edge for severing the grooved material from the main body thereof. The severed material is directed into a material receiving cavity by a smooth curved surface formed by the knife and the rotatable body member supporting the knife.

While several forms of the invention have been illustrated and described it is apparent that stripper knives of various shapes may be employed in the cutter head of this design to effect variation in the size, number and shape of the strips that are cut from the material. It will be further understood that various omissions, substitutions, changes in form, and details of the machine illustrated may be made by those skilled in the art, without departing from the spirit of the invention which is intended to be limited only as indicated by the scope of the following claims.

We claim:
1. A cutter head for a material cutting machine comprising:
   (a) a cylindrical body member adapted to be mounted for rotation about the longitudinal axis thereof, said body member having at least one axially extended cavity in the outer peripheral surface thereof having a leading portion and a trailing portion,
   (b) knife means secured to the body member adjacent said trailing portion, said knife means having a first cutting edge extended axially of the body member and second cutting edges extended circumferentially of the body member, said cutting edges being positioned radially of said cavity, and
   (c) the leading side of the knife means having an axially extended arcuate concave contour and the trailing portion of the cavity having an arcuate concave contour which joins with the contour of the knife means to form a smooth arcuate surface for guiding strips of material into the cavity.

2. A cutter head for a material cutting machine comprising:
   (a) a cylindrical body member adapted to be mounted for rotation about the longitudinal axis thereof, said body member having a peripheral surface defining at least one pair of axially extended cavities, each of which has a trailing portion,
   (b) first knife means secured to said body member rearwardly and adjacent the trailing portion of one cavity, said first knife means having a plurality of axially spaced teeth means positioned radially of said one cavity, each tooth of the teeth means having an axial knife edge, and a pair of axially spaced circumferentially extended knife edges,
   (c) second knife means secured to said body member adjacent the trailing portion of the other cavity, said second knife means having a cutting edge extended axially of and radially outwardly from the peripheral surface of said body member,
   (d) the leading sides of the first and second knife means having axially extended arcuate concave contours and the trailing portions of the cavities having arcuate concave contours which join with the contours of the first and second knife means to form a smooth arcuate surface for guiding strips of material into the cavities.

3. A cutter head for a material cutting machine comprising:
   (a) a cylindrical body member adapted to be mounted for rotation about the longitudinal axis thereof, said body member having at least one axially extended cavity in the outer peripheral surface thereof having a trailing portion of a concave contour,
   (b) knife means secured to the body member adjacent said trailing portion, said knife means having a leading side of an axially extended concave contour terminating at one end in an axially extended front cutting edge, and circumferentially extended cutting edges, said cutting edges positioned radially of said cavity and said leading side positioned adjacent said trailing portion to guide strips of cut material into the cavity.

4. A cutter head for a material cutting machine comprising:
   (a) a cylindrical body member adapted to be mounted for rotation about the longitudinal axis thereof, said body member having at least one axially extended cavity in the outer peripheral surface thereof having a trailing surface of an arcuate contour, and
   (b) knife means secured to the body member having a leading side of an arcuate contour and a flat trailing side which intersects the leading side at an acute angle to form a cutting edge extended axially of the body member,
   (c) said flat trailing side of the knife means being positioned in a plane substantially parallel to a plane tangential to said peripheral surface on a radius of the body member extended through said cutting edge, and said leading side being positioned forwardly of said trailing portion of the cavity to direct cut material into the cavity.

References Cited by the Examiner

UNITED STATES PATENTS

| | | | |
|---|---|---|---|
| 630,234 | 8/1899 | Jewett | 143—151 |
| 648,151 | 4/1900 | Leslie | 146—120 |
| 2,813,557 | 11/1957 | Thompson | 144—172 |
| 2,825,371 | 3/1958 | Forman | 144—172 X |
| 2,835,299 | 5/1958 | Pollmann | 146—119 |
| 3,037,540 | 6/1962 | Bloomquist et al. | 146—123 |

FOREIGN PATENTS 936,294  12/1955  Germany.

WILLIAM W. DYER, Jr., *Primary Examiner.*

W. GRAYDON ABERCROMBIE, *Examiner.*